3,498,466
BLADE SUPPORT STRUCTURE FOR CLARIFIER
SYSTEM OR THE LIKE
Leonhard Emil Fechter, Michelbacherhutte, and Dieter
Klump, Michelbach, Nassau, Germany, assignors to
Passavant-Werke, Michelbach, Nassau, Germany, a corporation of Germany
Filed Feb. 7, 1968, Ser. No. 703,739
Claims priority, application Germany, Feb. 17, 1967,
P 41,441
Int. Cl. B01d 43/00, 12/00
U.S. Cl. 210—525
8 Claims

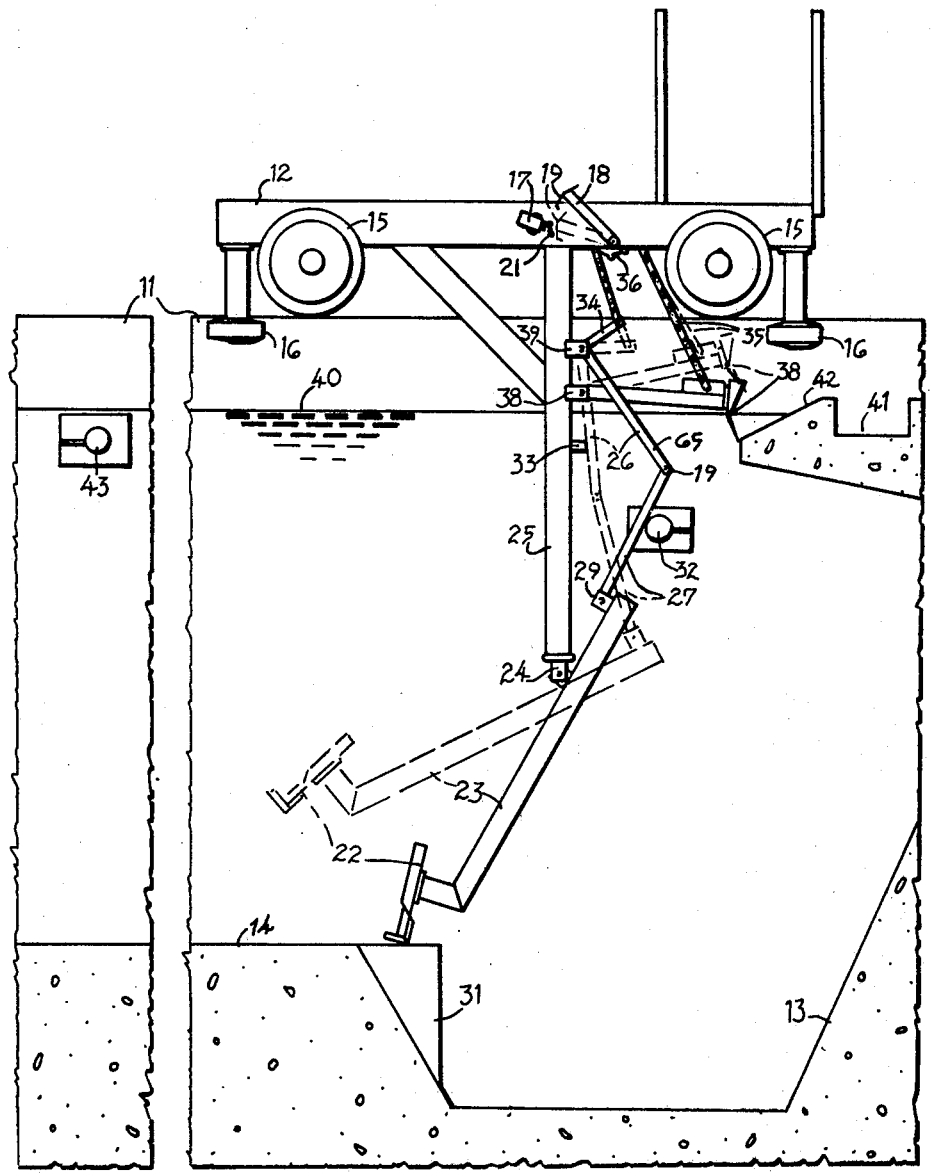

ABSTRACT OF THE DISCLOSURE

A bridge-type clarification system includes an improved toggle mechanism for raising and lowering a sludge collector member supported by a movable bridge structure.

BACKGROUND OF THE INVENTION

Field of the invention

The present invention relates generally to the treatment of sewage or the like and more particularly to clarification tank systems employed to effect separation of liquids and solids in sewage treatment installation. Still more particularly, the invention concerns improvements in means for supporting scrapers and related elements incorporated in bridge-type clarification tank systems.

Description of the prior art

A clarification tank system of the type to which the present invention relates comprises a horizontal elongate rectangular tank or basin in which separation of liquids and solids in sewage is achieved through quiescent settling of suspended solids to the floor of the tank, where such solids accumulate to form a layer of sludge. To dispose of this sludge, a sludge collector blade periodically scrapes it along the tank floor into a sludge trough or sludge well, from which it is removed for further drying and processing.

In a so-called bridge-type clarification tank system, the sludge collector structure comprises a movable bridge spanning the tank between its opposite side walls and supporting a sludge collector blade, which is thereby reciprocated longitudinally along the tank by corresponding movement of the bridge. As the bridge moves forwardly toward the end of the tank provided with the sludge well, the sludge collector blade is dragged along the tank floor to move the accumulated sludge along the floor and into the sludge well. During the opposite rearward movement of the bridge back to the other end of the tank, however, the scraper is raised to prevent disturbing the accumulating sludge layer.

In previous constructions of this general type, it is well known to effect continuous back and forth movement of the bridge between the opposite ends of the tank by automatically reversing the direction of movement of the bridge whenever it reaches a predetermined location adjacent the corresponding end of the tank. Also, it is known to provide such an arrangement with means for raising the blade and latching it in a raised position upon arrival of the bridge at the sludge well end of the tank; and for releasing the blade for downward movement in response to the completion of the rearward movement of the bridge. However, in such prior art constructions, the means employed for reversing the direction of movement of the bridge and the means by which the blade is raised and lowered have been independent of one another to the extent that the movement of the bridge is not positively correlated with the position of the blade or vice versa.

For example, if the blade should fail to return to its lowered position, the bridge nevertheless continues to move back and forth along the tank without performing its sludge collecting function. Similarly, if the blade lifting mechanism fails to raise the blade or to maintain it in its raised position throughout the rearward movement of the bridge, the accumulated sludge will be pushed to the wrong end of the tank, where it is inaccessible to the blade for subsequent movement to the sludge well. Moreover, the latter type of malfunction is very likely to damage the blade or its supporting structure or both inasmuch as the blade will be pushed along the tank bottom, rather than dragged, and is therefore incapable of riding over immovable obstructions or over irregularities in the internal tank surfaces.

The principal cause of malfunctioning of the blade positioning mechanism in such systems is that the operative elements of the latch mechanism are exposed to the corrosive and sedimentary environment of the liquid processed and are thereby ultimately corroded or polluted to the extent that the latch mechanism is incapable of dependably latching the blade in its raised position. The invention disclosed in commonly U.S. patent application Ser. No. 703,620 entitled, "Sewage Clarifier System or the Like," filed in our names concurrently with the present application, reduces the likelihood of this occurrence by improving the design and location of the cooperating separable latching surfaces; and also provides means for positively coordinating the movement of the bridge with the position of the blade so that failure of the latching mechanism prevents the bridge from moving in a direction which would damage the blade or its supporting structure.

SUMMARY OF THE INVENTION

The present invention comprises a further improvement in blade supporting and positioning means of the type described above, whereby separable latch elements are eliminated entirely and replaced by a simple and rugged toggle mechanism, the dependability of which exceeds even that of the improved latched arrangements covered by the above cited application.

Various means for practicing the invention and other features and advantages thereof will be apparent from the following description of a preferred embodiment of the invention incorporating the subject blade supporting structure in conjunction with a bridge control system and a scum collector device of the type covered by the aforementioned application; thereby providing a self controlling system of maximum simplicity and reliability.

BRIEF DESCRIPTION OF THE DRAWINGS

The accompanying drawing is a side elevational view of a bridge-type sludge collector unit embodying a blade supporting mechanism according to a preferred embodiment of the invention, such unit including a control system and scum collector blade corresponding to those covered by the previously identified pending patent application.

DESCRIPTION OF ILLUSTRATIVE PREFERRED EMBODIMENTS

In the accompanying drawing, the depicted clarification tank 11 and movable bridge 12 are typical of known systems of this type in which the tank is of generally rectangular elongate configuration and includes a sludge trough 13 at one end thereof below the level of the substantially flat tank floor 14. The bridge spans the tank and is movably carried by support wheels 15 riding along the top edges of the side walls thereof; with guide wheels 16 being adapted to contact the inner surfaces of the tank walls to restrict the lateral movement of the bridge. Various means, not shown, may be employed to move the bridge along the tank in either direction, preferably by imparting tractive torque to the bridge support wheels. Regardless of the means employed for this purpose, however, the movement of the bridge in this particular embodiment is controlled by a switch device including a roller 21 engageable by a shoe 19 of a pivotally supported control arm 18 to cause the bridge to move forwardly toward the sludge trough end of the tank whenever the control arm is positioned as shown in solid lines and rearwardly toward the opposite end of the tank whenever the arm is in the position shown in phantom lines.

Although only two support wheels and guide wheels are visible in the drawings, it should be apparent that both the bridge and the blade supporting and operating structure comprise two sets of the illustrated components in allochiral relation to each other adjacent opposite side walls of the tank. Accordingly reference in a plural sense to an element shown only once in the corresponding drawing will be understood to imply such duplication of that element.

The sludge collecton blade 22 extends across the tank and is provided with support arms 23 pivotally attached by pivot members 24 to rigid support bars 25 extending downwardly from the bridge. To raise and lower the blade, pairs of toggle bars 26 and 27 are pivotally connected between brackets 28 and 29 attached respectively to rigid support bars 25 and to the upper ends of support arms 23. As the bridge approaches the sludge trough end of the tank, the blade is moved along the floor of the tank and partially spans the sludge trough while supported at its opposite ends by floor projections 31 adjacent the tank walls, thus allowing the collected sludge to drop to the trough. Concurrently, the continuing forward movement of the bridge brings lower toggle bars 27 into contact with stationary lift members 32, which raise the blade by forcibly straightening the toggle units as shown in phantom lines in FIG. 6. For simplicity, the straightened condition of the toggle unit is shown while holding the bridge 12 stationary; and to do this, it is necessary to show the toggle unit spaced to the left of the lift member 32. However, in practice, when this straightening of the toggle unit occurs, the lower bar of the toggle unit actually abutts the stationary lift members 32 as the bridge 12 is actually located to the right of its position as shown in the figure. With the toggle units so positioned, the upper toggle bars are in abutment with stop members 33 on rigid support bars 25, whereby the centrol pivot points of the toggle units are located behind the lines defined by the end pivots of the respective pairs of bars to retain the blade in its raised position.

At the upper end of one of the upper toggle bars 26, an arm 34 extends angularly therefrom and is connected to a roller chain 35 partially encircling a sprocket 36 affixed to rotatable shaft 37, which serves to support control arm 18. The opposite end of this chain is attached to scum collector member 38 pivotally supported on rigid support bars 25 by pivot brackets 39. Accordingly, when the blade is positioned as shown in solid lines in the accompanying drawing, the corresponding position of the roller chain positions control arm 18 as shown in solid lines to effect forward movement of the bridge; and, simultaneously, supports the scum collector member at the surface of the liquid within the tank, as depicted at numeral 40. Therefore, during the forward movement of the bridge, the accumulated scum is collected from the surface of the liquid and is deposited in scum trough 41 as the scum collector member rides up the sloped leading surface 42 thereof.

As the bridge approaches the end of its forward movement path, the resulting straightening of the toggle units not only lifts the sludge collector blade, but also causes arm 34 to pull downwardly on the corresponding end of roller chain 35. Therefore the roller chain raises the scum collector member as shown in phantom lines and also rotates sprocket 36 so that shoe 19 of arm 18 moves to the similarly depicted position concurrently with the completion of the upward movement of the scum collector blade. Accordingly, the switch device 17 now causes the bridge to move rearwardly with the sludge collector blade and the scum collector member both retained in their respective raised positions by the toggle units. When this rearward movement brings the bridge adjacent its rearwardmost position, the upper toggle bars 26 abut again stationary trip members 43 and are rocked forwardly relative to the stop members 33 to allow the sludge collector blade and the scum collector member again to assume their operative positions. Simultaneously, the corresponding rotation of sprocket 36 returns control arm 18 to the position shown in solid lines, thereby causing control switch 17 again to initiate forward movement of the bridge.

From the foregoing description, it will be obvious that the bridge automatically moves alternately from one end of the tank to the other; with the sludge collector blade and the scum collector member being located in their respective lowered operative positions during the forward movement of the bridge and in their raised inoperative positions during rearward bridge movement. Also, it should be apparent that the present invention greatly reduces the possibility of malfunctioning associated with corresponding prior art devices by eliminating separable latch elements in favor of simple and rugged toggle means which are substantially immune to the influence of corrosion or sedimentation inasmuch as the entire tractive effort applied to the bridge is available to operate the toggle mechanism in either direction.

We claim:
1. In a clarification system including:
  (a) a liquid receiving tank having a generally horizontal floor,
  (b) a bridge member movable horizontally along said tank,
  (c) drive means operable selectively to move said bridge member along said tank in either of two opposite directions,
  (d) a sludge collector member,
  (e) collector support means extending from said collector member,
  (f) pivot means pivotally attaching said collector support means to said bridge member to support said sludge collector member from said bridge member for movement between
    (1) a lowered positon in which said sludge collector member contacts said floor, and
    (2) a raised position above said floor,
  the improvement comprising
  (g) a jointed toggle linkage operatively connecting said bridge with said support means, said toggle linkage being adjustable
    (1) to a relatively straight condition to locate said sludge collector member at a predetermined one of said raised and lowered positions, and
    (2) to an angular condition to locate said sludge collector member at the other one of said raised and lowered positions;
  (h) first toggle adjusting means for translating movement of said bridge in a predetermined one of said directions to a first location into adjustment of said toggle linkage to said relatively straight condition; and
  (i) second toggle adjusting means for translating movement of said bridge in the other of said directions to a second location into adjustment of said toggle linkage to said angular condition,
  (j) and retaining means, operatively connecting the jointed toggle linkage to the bridge for movement therewith along the tank, for retaining the sludge collector member in either of said raised or lowered positions between engagements of said jointed toggle linkage with said toggle adjusting means.

2. The invention defined by claim 1 in which said support means comprises a support arm pivotally attached to said bridge between its opposite ends by said pivot means, said support arm being attached at one end to said sludge collector member and at its opposite end to said bridge through said toggle linkage.

3. The invention defined by claim 1 including control means actuated by said toggle linkage for operating said drive means to move said bridge member
    (a) in a predetermined one of said two opposite directions whenever said toggle linkage is adjusted to said relatively straight condition; and
    (b) in the other of said two opposite directions whenever said toggle linkage is adjusted to said angular condition.

4. The invention defined by claim 1 including
    (a) a scum collector member movable between an operative location and an inoperative location, and
    (b) locating means connecting said scum collector member with said toggle linkage to locate said scum collector member
        (1) at said inoperative location whenever said toggle linkage is adjusted to a predetermined one of said conditions and
        (2) at said operative location whenever said toggle linkage is adjusted to the other of said conditions.

5. The invention defined by claim 2 in which said toggle linkage comprises
    (a) a lower toggle bar pivotally connected at its lower end to said opposite end of said support arm in spaced relation to said
    (b) an upper toggle bar pivotally connected at its upper end to said bridge member and at its lower end to the upper end of said lower toggle bar.

6. The invention defined in claim 5 in which said toggle adjusting means comprises fixed abutment members respectively adjacent said first and second locations and engageable by said toggle linkage upon corresponding movement of said bridge to said locations.

7. In a clarification system including:
    (a) a liquid receiving tank having a generally horizontal floor,
    (b) a bridge member movable horizontally along said tank,
    (c) drive means operable selectively to move said bridge member along said tank in either of two opposite directions,
    (d) a sludge collector member,
    (e) collector support means extending from said collector member,
    (f) pivot means pivotally attaching said collector support means to said bridge member to support said sludge collector member from said bridge member for movement between
        (1) a lowered position in which said sludge collector member contacts said floor, and
        (2) a raised position above said floor,
    the improvement comprising
    (g) a jointed toggle linkage operatively connecting said bridge with said support means, said toggle linkage being adjustable
        (1) to a relatively straight condition to locate said sludge collector member at a predetermined one of said raised and lowered positions, and
        (2) to an angular condition to locate said sludge collector member at the other one of said raised and lowered positions;
    (h) first toggle adjusting means for translating movement of said bridge in a predetermined one of said directions to a first location into adjustment of said toggle linkage to said relatively straight condition; and
    (i) second toggle adjusting means for translating movement of said bridge in the other of said directions to a second location into adjustment of said toggle linkage to said angular condition,
and including control means operatively connected to and actuated by the said toggle linkage for operating said drive means to move said bridge member, said control means being operable to move the drive means in one direction when the jointed toggle linkage is in its relatively straight condition, and said control means being operable to operate said drive means in the other direction when said jointed toggle linkage is in its angular condition.

8. In a clarification system including:
    (a) a liquid receiving tank having a generally horizontal floor,
    (b) a bridge member movable horizontally along said tank,
    (c) drive means operable selectively to move said bridge member along said tank in either of two opposite directions,
    (d) a sludge collector member,
    (e) collector support means extending from said collector member,
    (f) pivot means pivotally attaching said collector support means to said bridge member to support said sludge collector member from said bridge member for movement between
        (1) a lowered position in which said sludge collector member contacts said floor, and
        (2) a raised position above said floor,
    the improvement comprising
    (g) a jointed toggle linkage operatively connecting said bridge with said support means, said toggle linkage being adjustable
        (1) to a relatively straight condition to locate said sludge collector member at a predetermined one of said raised and lowered positions, and
        (2) to an angular condition to locate said sludge collector member at the other one of said raised and lowered positions;
    (h) first toggle adjusting means for translating movement of said bridge in a predetermined one of said directions to a first location into adjustment of said toggle linkage to said relatively straight condition; and
    (i) second toggle adjusting means for translating movement of said bridge in the other of said directions to a second location into adjustment of said toggle linkage to said angular condition,
a scum collector member moveable between an operative location and an inoperative location, and locating means connecting said scum collector member with said toggle linkage to locate said scum collector member (a) at said inoperative location whenever said toggle linkage is adjusted to a predetermined one of said condition and (b) at said operative location whenever said toggle linkage is adjusted to the other of said condition.

References Cited

FOREIGN PATENTS 733,825   7/1955   Great Britain.

JAMES L. DECESARE, Primary Examiner

U.S. Cl. X.R.

210—527